Patented June 20, 1939

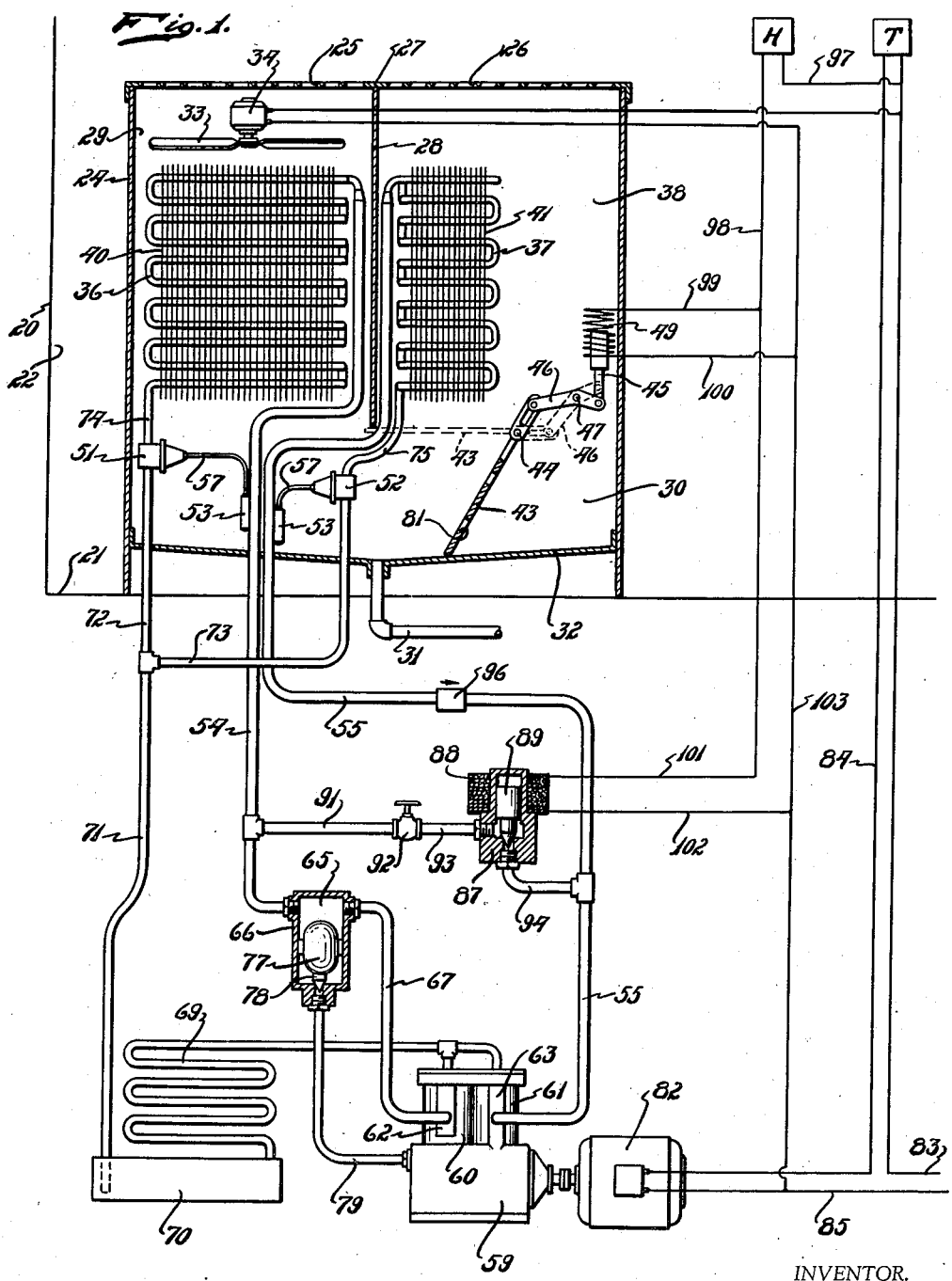

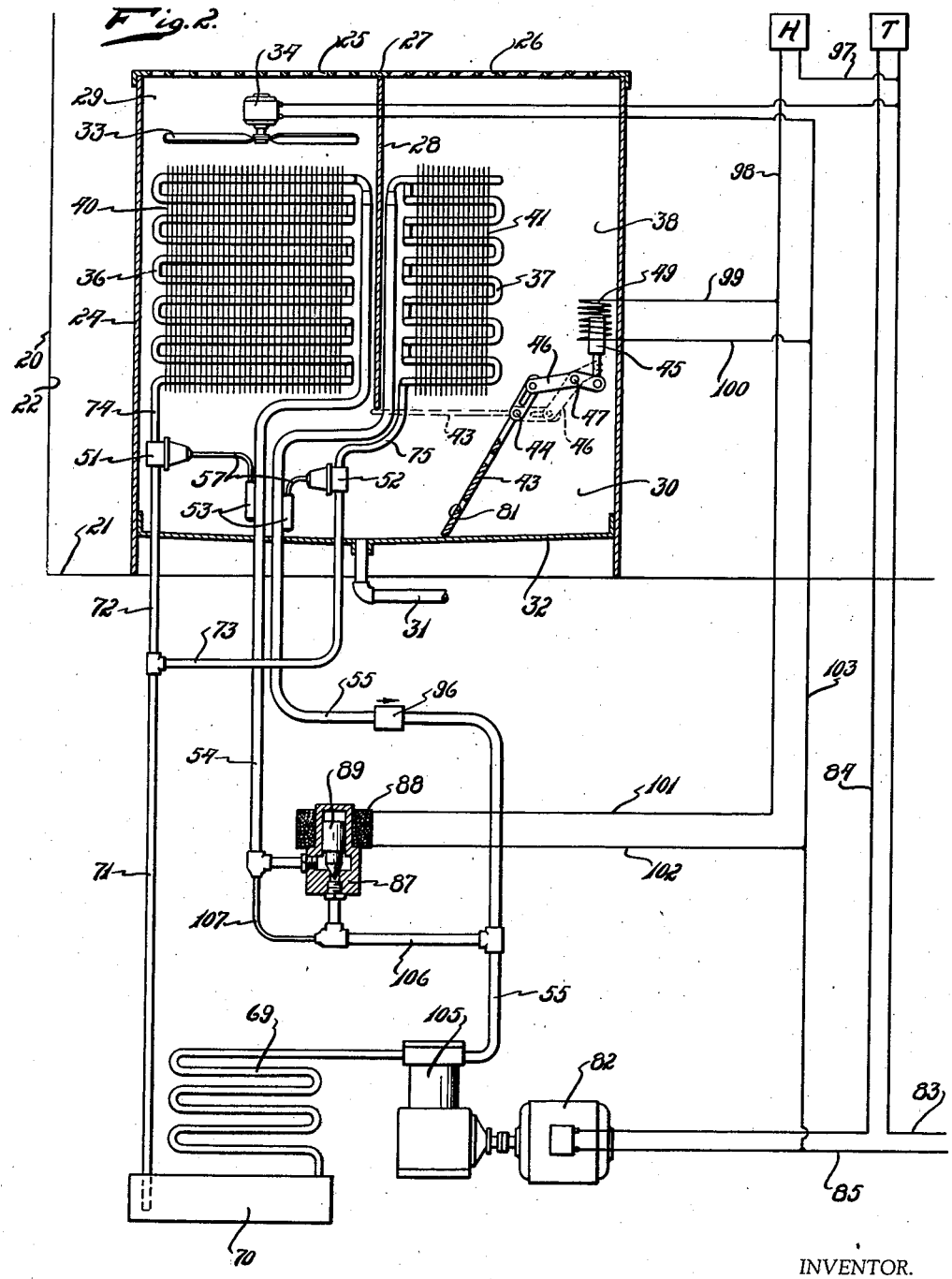

2,162,860

UNITED STATES PATENT OFFICE 2,162,860

AIR CONDITIONING SYSTEM

Lawrence A. Philipp, Detroit, Mich., assignor, by mesne assignments, to Nash-Kelvinator Corporation, Detroit, Mich., a corporation of Maryland Application February 3, 1934, Serial No. 709,662

5 Claims. (Cl. 62—6)

The present invention relates to air conditioning systems, and particularly to systems in which the air is conditioned by refrigeration.

One of the objects of the present invention is to provide an improved method of and apparatus for conditioning air utilizing two heat absorbers, one for cooling the air to remove principally sensible heat therefrom and another for cooling the air to below the dew point thereof for removing moisture from the air, and utilizing mechanism responsive to the relative humidity of the air for controlling the flow of air to be refrigerated.

In connection with the above object, it is a further object of the invention to vary the heat exchange between the air and the heat absorbers in accordance with the temperature of the air.

Another object of the present invention is to provide for varying the heat exchange between the air and the heat absorber, which is utilized to remove principally sensible heat and to provide for the decrease of such heat exchange when the relative humidity is high and air is flowing over the other heat absorber to remove latent heat therefrom.

Other and further objects and advantages will be apparent from the following disclosure, reference being had to the accompanying drawings wherein a preferred form of embodiment of the present invention is clearly shown.

In the drawings:

Fig. 1 is a diagrammatic view of one form of my improved air conditioning system; and Fig. 2 is a diagrammatic view of another form of air conditioning system.

My invention contemplates the use of a plurality of heat absorbers, or an absorber having a plurality of sections, in which each heat absorber, or heat absorber section, as the case may be, provides a plurality of heat absorbing surfaces. One of these heat absorbers or heat absorber sections is utilized for the purpose of removing principally sensible heat from the air flowing thereover and another heat absorber or section is utilized for cooling the air to below the dew point thereof for the purpose of causing precipitation of moisture and a consequent dehumidification of the air. In accordance with the present invention, the flow of air over the latter heat absorber is controlled in response to the relative humidity of the air.

At times, it is necessary to reduce the air to a relatively low temperature in order to cause precipitation of moisture therefrom and in order to prevent the air, emanating from the air conditioner, from being too cold for comfort, I temper the relatively cold air with relatively warm air within the air conditioner and in order to accomplish this, at the time that the air conditioner is functioning to dehumidify the air, the heat absorber, which is utilized for removing principally sensible heat, automatically operates so that the heat exchange between the air flowing thereover and the said absorber is less than when the conditioner is operating for the purpose of removing principally sensible heat. This air which is cooled by both absorbers is mixed within the air conditioner so that at all times the air emanating from the air conditioner is at substantially the same temperature.

Referring to the drawings, I will first describe the system shown in Fig. 1, in which the numeral 20 indicates a side wall and 21 the floor of a room 22. Within the room 22 there is disposed a cabinet 24 having air inlet openings 25 and air outlet openings 26 in the top 27 thereof. A partition wall 28 depends from the top wall 27 and extends from the front to the rear of the cabinet for dividing the same into two compartments 29 and 30. A drain pipe 31 in the bottom of the cabinet conducts water therefrom. The partition wall 28 stops short of the bottom 32 of the cabinet and provides for the passage of air between compartments 29 and 30. A fan 33 disposed within the compartment 29 and driven by a motor 34 causes the forced circulation of air within the cabinet 24.

A heat absorber is disposed within the cabinet 24 and is formed into two sections; one section 36 is disposed within compartment 29 and the other section 37 is disposed within compartment 30. These sectional absorbers may be of any suitable type but they are herein shown as evaporator sections and for the purpose of simplicity they will be hereinafter designated as absorbers or evaporators.

It will be noted that evaporator 36 extends substantially across the width of compartment 29. It also extends substantially from the front to the rear of the cabinet so that all air passing through compartment 29 passes in heat exchange relation with the evaporator 36. The evaporator 37 is disposed to one side in compartment 30 so as to provide a passage 38 for the free flow of air through compartment 30 without coming in contact with the evaporator 37. Fins 40 and 41 are carried by the evaporators 36 and 37 to increase the heat absorbing surfaces thereof.

A baffle 43 is carried within the compartment 30 for causing the air to flow either through the passage 38 of compartment 30 or about the evaporator 37. This baffle is hinged at 44 and is adapted, when in the position shown in full lines in the drawings, to cause the air to flow over the evaporator 37, and when it is in the position shown in dotted lines, it causes the air to by-pass the evaporator 37 and to flow through the passage 38. This baffle 43 is actuated by a magnet core 45 through a link 46 which is pivoted at 47. Magnet core or solenoid 45 is raised to move the damper 43 to the dotted line position when a magnet coil 49 is energized, and when the magnet coil 49 is de-energized, the baffle drops to the position shown in full lines.

The flow of refrigerant to evaporators 36 and 37 is controlled by expansion valves 51 and 52. Any suitable type of expansion valves may be employed and in the present disclosures there is shown the well known type of pressure operated expansion valves which are responsive respectively to the pressures within evaporators 36 and 37 and are responsive respectively to the outlet temperatures of said evaporators. A reduction in pressure within an evaporator tends to open its respective expansion valve to admit liquid refrigerant to the said evaporator but this opening of the valve is modified by a thermostat 53. The thermostats 53 are bonded to the outlet pipe 54 and 55 of the respective evaporators 36 and 37 and are connected to the backsides of the respective expansion valves 51 and 52 by tubes 57. Each of the thermostats 53 and tubes 57 contain a volatile fluid and, therefore, this system varies the pressure on the back side of the valve to which it is connected and is adjusted to operate the valve to prevent or substantially prevent the flow of refrigerant therethrough when vaporization of refrigerant is taking place at the point where the thermostat 53 is connected to the outlet pipe; namely, at the outlet of the evaporator. This type of expansion valve is known in the art as "thermostatically controlled expansion valve" and one form of such valve is disclosed in my copending application, Serial No. 697,169, filed November 8, 1933, and a similar valve is disclosed in the Marshall Patent No. 1,425,265 of August 8, 1922.

Gaseous refrigerant is withdrawn from the evaporators 36 and 37 by a compressor 59. This compressor is provided with two cylinders 60 and 61 each having an inlet 62 and 63, respectively. The outlet pipe 54 leading from evaporator 36 is connected with the float chamber 65 of a float valve 66. Gaseous refrigerant flows from the chamber 65 through a pipe 67 to the inlet 62 of cylinder 60. The outlet pipe 55 of evaporator 37 is connected with the inlet 63 of cylinder 61. The refrigerant is compressed by the compressor cylinders 60 and 61 and forced into a condenser 69 wherein it is liquefied and flows to a receiver 70. The liquefied refrigerant is conducted from the receiver 70 through a pipe 71 and branch pipes 72 and 73 to expansion valves 51 and 52 whence the refrigerant flows by pipes 74 and 75 to evaporators 36 and 37.

Oil for lubricating the compressor is contained within the crank case thereof and some of this oil passes with the refrigerant into the evaporators and is carried with the gaseous refrigerant from the evaporators through pipes 54 and 55. The inlet 63 of cylinder 61 is connected with the interior of the crank case so that any oil returned from evaporator 37 can return to the crank case. However, it is not desirable to connect evaporator 36 with the crank case of the compressor and, therefore, the inlet 62 of cylinder 60 is not in communication with the crank case of the compressor. The oil from evaporator 36 is trapped within the float chamber 65 and after a predetermined quantity of oil accumulates within chamber 65, a float 77 therein opens a valve 78 permitting the oil to flow by pipe 79 to the crank case of compressor 59.

The cylinders 60 and 61 and evaporators 36 and 37 are computed in size so that when these cylinders are individually connected with their respective evaporator, a relatively colder temperature will be maintained in evaporator 37 than in 36. Air flowing over evaporator 36 will be cooled somewhat. However, since evaporator 37 is maintained at a relatively colder temperature, the air flowing thereover will be cooled to considerably below the dew point thereof to cause precipitation of moisture and a consequent dehumidification of the air. This precipitation is conducted out of the cabinet by a drain pipe 31. If desirable, some air may by-pass the evaporator 37 through the passage 38. This by-passed air would not be cooled by evaporator 37 to the same degree and would mix with the air at the outlet of the conditioner and this relatively warm air would temper the air passing over evaporator 37. The escape of air by the baffle 43 can be arranged for in any manner and for the purpose of illustrating one form, I have shown baffle as being provided with small openings 81.

The heat exchange between the evaporators 36 and 37 and the air to be conditioned is controlled by starting and stopping the compressor 59. The compressor is driven by a motor 82 which is controlled by a room thermostat T. Current for the motor flows from wire 83 through thermostat T, wire 84, motor 82 and wire 85. When the temperature of the air in the room attains a predetermined low degree, the thermostat T interrupts the motor circuit and reconnects the motor in circuit when the temperature of the air in the room attains a predetermined high degree.

It is also desirable to control the relative humidity of the air in the room and for this purpose, I provide a humidostat H, an automatic damper control by electro-magnet 49, and a valve 87. When the relative humidity of the air in the room is below a predetermined percentage, I desire to utilize the air conditioning system for removing principally sensible heat from the air and to accomplish this, the humidostat is arranged to energize magnet coil 49 to move the damper 43 to the dotted line position whereby all or substantially all of the air by-passes evaporator 37 and flows through passage 38, and in addition to this I decrease the temperature of evaporator 36 so that this evaporator will provide the proper refrigerating condition. The valve 87 includes a magnet winding 88 which when energized lifts a solenoid valve 89 from its seat to permit the flow of refrigerant through the valve 87. Refrigerant can then flow from pipe 54 leading from evaporator 36 through pipe 91, valve 92, pipe 93, valve 87, pipe 94 to pipe 55, which is connected with the inlet 63 of compressor 61. It is apparent that when valve 89 is open, cylinder 61 is connected with evaporator 36 and assists in reducing the pressure and, consequently, the temperature within evaporator 36. It is desirable to limit the influence of cylinder 61 on evaporator 36 and for this purpose there is provided a restriction in the form of the valve 92. It is not desirable to permit the relatively high pressure refrigerant from evaporator 36 to enter evaporator 37 even when the valve 89 is open, and for this purpose there is provided a check valve 96 in pipe 55 which prevents the back flow toward the evaporator 37.

From the foregoing, it will be seen that when the relative humidity of the air in the room is below a predetermined desired maximum, damper 43 will be in the dotted line position and valve 89 will be open. The electrical circuit for maintaining these positions of the damper 43 and valve 89 includes wire 83, thermostat T, wire 97, humidostat H, wire 98, whence the current flows through the parallel circuits including wire 99, coil 49, wire 100 and also wire 101, coil 88, wire 102, to wire 103, which connects with the opposite side of the line 85. The cylinders 60 and 61 of compressor 59 will then function primarily for the purpose of cooling evaporator 36. At this time evaporator 37 merely floats in the system but is cooled to at least the same temperature as evaporator 36. The system will continue to function in this manner until the temperature of the air in the room is decreased to a predetermined desired low degree at which time the thermostat T will interrupt the motor circuit, or if the relative humidity of the air should increase to above a predetermined maximum while the temperature of the air is above a predetermined desired degree, the humidostat H will operate to interrupt the circuits of the coils 49 and 89 whereby the damper 43 will be moved to the full line position and the valve 89 will be closed. In this event, air will flow over the evaporator 37 and since the cylinder 61 is now concentrated on reducing the pressure and likewise the temperature in evaporator 37, the temperature of evaporator 37 will be materially decreased and will be decreased to such low temperature that the air flowing thereover will be lowered to considerably below the dew point thereof. At this time, since cylinder 61 is no longer connected with evaporator 36, the temperature of evaporator 36 will be increased with the result that the air emanating from the cabinet will be at substantially the same temperature as the air emanating from the cabinet when the evaporator 37 is not so cold.

In the form of the invention shown in Fig. 2, gaseous refrigerant from both evaporators 36 and 37 is taken into the low pressure side of a compressor 105 at the same inlet thereof at all times. In this form of the invention, the outlet pipe 54 of evaporator 36 is connected with outlet pipe 55 through valve 87 and a pipe 106 and through a restricting pipe 107 which by-passes valve 87.

When the relative humidity of the air in the room is below a predetermined desired minimum, damper 43 will be in the dotted line position and valve 87 will be open and, consequently, both evaporators will operate at substantially the same temperature, and the temperature of evaporator 36 will be such that principally only sensible heat will be removed from the air. When the relative humidity of the air in the room increases to above a predetermined maximum percentage, the humidostat H will interrupt the circuits to coils 49 and 88 whereby the damper 43 will move to the full line position and valve 87 will close. Air will then flow freely or more freely over evaporator 37. At this time, the flow of refrigerant from the evaporator 36 to the compressor 105 will be restricted to that which can flow through the by-pass pipe 107 and the arrangement is such that the suction action of the compressor 105 is concentrated primarily upon reducing the temperature of evaporator 37 with the result that the temperature of evaporator 36 will be increased and the temperature of evaporator 37 will be materially decreased to considerably below the dew point of the air.

It is apparent, from the foregoing, that I have provided air conditioning systems in which I not only maintain the air at the desired temperature but also attain the proper dehumidification of the air. The thermostat T functions to control the heat exchange between the air and the evaporators to maintain the desired temperature and the humidostat H controls the relative temperatures of the evaporators 36 and 37 and controls the flow of air through the passage 38 and about the evaporator 37.

Under certain conditions, it may be desirable to cause some precipitation of moisture at the evaporators 36 and 37 when the damper 43 is in the dotted line position and the valve 87 is open, and it is to be understood that when the evaporator 36 is referred to as functioning to remove principally sensible heat, such terms are used merely to define the main functional purpose of the evaporator 36 as distinguished from the main functional purpose of evaporator 37 at the time the valve 87 is closed and the damper 43 is in the full line position.

While the form of embodiment of the present invention as herein disclosed constitutes a preferred form, it is to be understood that other forms might be adopted, all coming within the scope of the claims which follow.

I claim:

1. An air conditioning system comprising, in combination, a heat absorber, the main function of which is to remove principally sensible heat from air flowing thereover, a second heat absorber adapted to cool air flowing thereover to below the dew point thereof, means for controlling the flow of air over the second mentioned heat absorber, and means responsive to the relative humidity of the air to be conditioned for effecting a change in temperature of the first mentioned heat absorber and for actuating the controlling means.

2. An air conditioning system comprising, in combination, a heat absorber, the main function of which is to remove principally sensible heat from air flowing thereover, a second heat absorber adapted to cool air flowing thereover to below the dew point thereof, means for controlling the flow of air over the second mentioned heat absorber, and means responsive to a humidity condition in excess of a predetermined percentage for effecting an increase in temperature of the first mentioned heat absorber, and for causing an increased flow of air about the second mentioned heat absorber.

3. An air conditioning system comprising, in combination, refrigerating apparatus including an evaporator, the main function of which is to remove principally sensible heat from air flowing thereover, a second evaporator adapted to cool air flowing thereover to below the dew point thereof, means for controlling the flow of air over the second mentioned evaporator, and means responsive to the relative humidity of the air to be conditioned for effecting a change in temperature of the first mentioned evaporator and for actuating the controlling means.

4. An air conditioning system comprising, in combination, refrigerating apparatus including an evaporator, the main function of which is to remove principally sensible heat from air flowing thereover, a second evaporator adapted to cool air flowing thereover to below the dew point thereof, means for controlling the flow of air over the second mentioned evaporator, and means responsive to a humidity condition in excess of a predetermined percentage for effecting an increase in temperature of the first mentioned evaporator, and for causing an increased flow of air about the second mentioned evaporator.

5. The method of conditioning air in a treating zone which comprises, causing air to circulate at a substantially constant rate, controlling the amount of sensible heat removed from the air by reducing the temperature of said zone in accordance with a demand for reduction in temperature of the air, and controlling the amount of latent heat removed from the air during said demand by effecting a further reduction in temperature in said zone while modifying the heat load applied to said treating zone solely in accordance with changes in the relative humidity of the air.

LAWRENCE A. PHILIPP.